US006823476B2

(12) United States Patent
Williams et al.

(10) Patent No.: US 6,823,476 B2
(45) Date of Patent: Nov. 23, 2004

(54) MECHANISM TO IMPROVE FAULT ISOLATION AND DIAGNOSIS IN COMPUTERS

(75) Inventors: Emrys Williams, Sunnyvale, CA (US); Robert Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 11 days.

(21) Appl. No.: 10/328,539

(22) Filed: Dec. 23, 2002

(65) Prior Publication Data

US 2003/0163764 A1 Aug. 28, 2003

Related U.S. Application Data

(63) Continuation of application No. 09/413,108, filed on Oct. 6, 1999, now Pat. No. 6,519,717.

(51) Int. Cl.[7] .................................................. G06F 11/00
(52) U.S. Cl. ......................... 714/25; 714/37; 714/758; 714/799
(58) Field of Search ............................... 714/37, 48, 52, 714/799, 748, 752, 758, 4

(56) References Cited

U.S. PATENT DOCUMENTS

| | | | |
|---|---|---|---|
| 3,814,922 A | | 6/1974 | Nibby et al. |
| 4,375,664 A | | 3/1983 | Kim |
| 4,466,099 A | * | 8/1984 | Meltzer ...................... 714/798 |
| 4,589,112 A | | 5/1986 | Karim |
| 4,780,809 A | * | 10/1988 | Woffinden et al. ............ 714/48 |
| 4,995,041 A | | 2/1991 | Hetherington et al. |

(List continued on next page.)

FOREIGN PATENT DOCUMENTS

GB        2 216 690        10/1989

OTHER PUBLICATIONS

International Search Report, Application No. PCT/US 00/26506, mailed Jan. 15, 2001.

"32–Bit–Wide Memory Tolerates Failures," NTIS Tech Notes, Oct. 1990, p. 818.

Dell, "A White Paper on the Benefits of Chipkill–Correct ECC for PC Server Main Memory," Nov. 1997, pp. 1–23.

(List continued on next page.)

*Primary Examiner*—Robert Beausoliel
*Assistant Examiner*—Marc M Duncan
(74) *Attorney, Agent, or Firm*—Meyertons Hood Kivlin Kowert & Goetzel, P.C.; B. Noël Kivlin

(57) ABSTRACT

A system and method for improving the isolation and diagnosis of hardware faults in a computing system wherein means are provided for indicating whether unusable data has previously triggered diagnosis of the hardware fault that caused the data to be unusable. If diagnosis has not been performed, the flag is not set. If diagnosis has already been performed, the flag is set. One embodiment comprises an interface which is used to convey data from one subsystem to another. When the interface receives data from the first subsystem, the data is examined to determine whether it contains an uncorrectable error (including missing data.) If the data contains an uncorrectable error, the interface examines the flag corresponding to the data to determine whether hardware fault diagnosis has already been initiated. If diagnosis has already been initiated, the data is passed to the second subsystem without initiating further diagnosis. If diagnosis has not been initiated, the interface initiates diagnosis and sets the flag to indicate that diagnosis has already been initiated. The data and corresponding flag are then passed to the second subsystem. If the data contains an uncorrectable error, data error handling procedures will be performed by the subsystem that requested the data, regardless of the value of the corresponding flag.

37 Claims, 6 Drawing Sheets

U.S. PATENT DOCUMENTS

| | | | |
|---|---|---|---|
| 5,164,944 A | | 11/1992 | Benton et al. |
| 5,574,856 A | | 11/1996 | Morgan et al. |
| 5,612,965 A | | 3/1997 | Michaelson |
| 5,619,642 A | * | 4/1997 | Nielson et al. ............... 714/6 |
| 5,666,371 A | | 9/1997 | Purdham |
| 5,719,887 A | * | 2/1998 | Kazuno ...................... 714/6 |
| 5,815,099 A | | 9/1998 | Gledhill et al. |
| 5,909,541 A | | 6/1999 | Sampson et al. |
| 5,953,351 A | * | 9/1999 | Hicks et al. ............... 714/763 |
| 5,987,628 A | | 11/1999 | Von Bokern et al. |
| 6,035,432 A | | 3/2000 | Jeddeloh |
| 6,119,248 A | * | 9/2000 | Merkin ...................... 714/52 |
| 6,215,250 B1 | | 4/2001 | Williams |
| 6,216,250 B1 | * | 4/2001 | Williams ................... 714/799 |
| 6,317,855 B1 | | 11/2001 | Horibe |
| 6,367,045 B1 | | 4/2002 | Chapman et al. |
| 6,385,665 B1 | * | 5/2002 | Canady et al. ................. 710/2 |
| 6,490,697 B1 | * | 12/2002 | Machida et al. ............. 714/42 |

OTHER PUBLICATIONS

"Parallel Parity," 1994, http:/ /bbs–koi.uniinc.msk.ru, 1 pg.

"Modulo–2 Arithmetic," 1994, http:/ / bbs–koi.uniinc.msk.ru, 1 pg.

"Introduction to Error Control," 1994, http:/ /bbs–koi.uniinc.msk.ru, 1 pg.

Barker, "ASCII Table," Feb. 1998, http:/ / www.eng2.uconn.edu, 1 pg.

"Parity & Computing Parity," 1994, http:/ /bbs–koi.uniinc.msk.ru, 2 pgs.

"Error Correction with Hamming Codes," 1994, http:/ /bbs–koi.uniinc.msk.ru, 2 pgs.

Barker, "Hamming Code—Background," Feb. 1998, http:/ / www.eng2.uconn.edu, 3 pgs.

Barker, "Hamming Code—Theory," Feb. 1998, http:// www.eng2.uconn.edu, 2 pgs.

"NUMA: Delivering the Next Level of Commodity SMP Performance," 1996, 5 pgs.

Barker, "General Definitions," Feb. 1998, http:// www.eng2.uconn.edu, 3 pgs.

Barker, "Hamming Code—Lab Procedure," Feb. 1998, http:/ /www.eng2.uconn.edu, 3 pgs.

\* cited by examiner

MECHANISM TO IMPROVE FAULT ISOLATION AND DIAGNOSIS IN COMPUTERS

This application is a continuation application of U.S. patent application Ser. No. 09/413,108, filed Oct. 6, 1999, now U.S. Pat. No. 6,519,717.

BACKGROUND OF THE INVENTION

1. Field of the Invention

The invention relates generally to error detection and handling in computer systems, and more particularly to a method and apparatus for identifying data which is unusable and for initiating or inhibiting diagnosis of the hardware faults that caused the data to be unusable.

2. Description of Related Art

Computer systems typically include a number of active devices or components such as processors, I/O bridges and graphics devices, as well as a memory system. Any of these devices, or the interconnections between them, can experience hardware faults which cause errors in data or difficulty reaching data through the faulty hardware.

Many error management techniques have been developed to aid diagnosis and limit the effect of these errors. One simple technique is parity checking. Parity checking utilizes a single bit (the parity bit) associated with a piece of data (typically a byte) to determine whether there is a single-bit error in the data. Parity checking cannot detect multiple-bit errors, however, and provides no means for correcting even single-bit errors. A more sophisticated system uses error correction codes (ECC) to detect and even to correct some errors. ("error detection/correction" will be used generally herein to identify the systems and bits, or codes, which are used in both error detection and error correction, including ECC codes and parity.) An ECC code consists of a group of bits associated with a piece of data. A typical ECC system may use eight ECC bits (an ECC code) to detect and correct errors in a 64-bit piece of data. The ECC bits provide enough information for an ECC algorithm to detect and correct a single-bit error, or to detect errors in two bits. If this particular system detects errors in two bits, the errors cannot be corrected.

If a data error can be corrected (e.g., if the memory system uses a single-bit correcting ECC code and there is a single-bit error), the error is simply corrected and operation of the system continues normally. If an error cannot be corrected, it may propagate through the system, causing additional errors and prompting diagnoses of hardware faults which may not exist.

For example, with reference to the system illustrated in FIG. 1, a fault in cache 12 may cause an error in a data value stored in the cache. If the data in cache 12 is in a modified or "dirty" state, it may have to be copied out of the cache so that other processors can use it. If an error in the modified cache line cannot be corrected, hardware diagnosis may be initiated to determine the source of the error. The error may then be propagated when it is written by processor 11 to the bus 19 and/or main memory 18. If another processor (e.g. processor 13) reads the data value and stores the data value in cache 14, it will see the uncorrectable error and may initiate a second hardware diagnosis. This second diagnosis may indicate a hardware fault in processor 13, cache 14 or main memory 18, when the error actually arose in cache 12. The error may propagate throughout the system, including processors and caches (e.g. 15, 16) which are interfaced remotely to the system (e.g. by interface 17).

If a data error cannot be corrected (e.g., if the memory system only uses parity checking, or if there are too many bit errors for an ECC system to correct), the data may be referred to as unusable data. When a prior art system attempts to access a piece of unusable data, the device from which the data is requested may respond in one of several ways. In one instance, a processor accessing the unusable data may retrieve the data, determine that it is unusable, and append a new ECC code based on the unusable data to allow subsequent errors to be detected. This would allow the original error to spread through the system without detection.

In another instance, the memory storing the unusable data might simply not return any data at all. In contrast to the previously described implementation, this would prevent the spread of the errors therein. In response to the failure to return any data, the device attempting to access the data would time out and initiate diagnosis to determine the source of the error. As indicated above, however, the error may have arisen prior to this access, so it is likely that the diagnosis will provide no useful information. In fact, the initiation of the diagnosis may actually confuse the issue of where the error arose, since the hardware involved in the access may not have caused the error. This implementation can also suffer substantial performance losses, since each device that attempts to access the data can time out and initiate a diagnosis, both of which waste otherwise useful processing power.

In another instance, the memory containing the faulty data may return the data and the associated ECC code as they were stored (i.e., with errors). In this situation, the processor accessing the data would initiate hardware diagnosis, which would likely turn out to be futile and confusing.

In another instance, the memory may return a predetermined ECC code which indicates a multiple-bit error. It could be difficult, however, for some devices accessing the data to distinguish between this predetermined ECC code (which indicates generally that the data is corrupted) and an ECC code which represents an actual, multiple-bit error. This difficulty could be increased if a subsequent single-bit error occurred in the transmission path between the memory and the accessing device.

Whatever the response of the device from which the data was requested, an access to unusable data usually results in one of two standard responses by the computer itself. The first of the standard responses is for the computer to interrupt its operation and reboot itself. This response, of course, results in the termination of all applications executing on the computer and the loss of all work performed by the applications up to that point. The applications have to be re-started and any lost work must be performed again. One of the significant problems With this response is that even those applications that did not access the unusable data, and would not have accessed this data, are nevertheless terminated.

The second of the standard responses is to provide an indication of the unusable data whenever the data is accessed. This may be accomplished by simply failing to provide the data (which typically causes the device requesting the data to time out,) or by providing the data along with an ECC code which indicates that the data is unusable. This second response resolves the problem of indiscriminately terminating all applications, as only those applications that access the data are aware of the error and have to handle the error (e.g. by terminating themselves). The device that receives the data, however, is aware only that it has not received error-free data. It may therefore be difficult for this device to determine how the error arose. Consequently, error reports may be generated each time the data is accessed, which may lead to unnecessary diagnoses or diagnoses of hardware failures which may not actually have occurred. In a system which uses a specific ECC code to indicate that unusable data has been detected earlier, the occurrence of an additional, later, single-bit error may further confuse the situation. Additionally, as indicated above, waiting for the requesting device to time out increases the average latency of memory accesses and degrades the performance of the system.

SUMMARY OF THE INVENTION

The problems outlined above may in large part be solved by a system and method for improving the isolation and diagnosis of hardware faults in a computing system. Generally speaking, the system provides a mechanism for indicating whether unusable data has previously triggered diagnosis of the hardware fault that caused the data to be unusable. The mechanism employs a flag associated with the data that indicates whether diagnosis has been performed. If diagnosis has not been performed, the flag is not set (i.e., the flag has a "false" value.) If diagnosis has already been performed, the flag is set (i.e., the flag has a "true" value.)

Data may be unusable because it contains errors which are not correctable by available error correction mechanisms, or because it is missing (i.e., it is never received.) In one embodiment, whenever data is requested but not received, and whenever received data contains uncorrectable errors, status information is captured and diagnosis of the hardware fault that caused the error is initiated. The unusable data is passed on, along with a flag which is set to indicate that the data is unusable. If the received, unusable data had a flag which was not set, the flag is set. If the received, unusable data did not have a flag, the flag is generated and passed on with the unusable data. If the passed-on data is covered by error detection/correction, a new error detection/correction code is generated to cover the unusable data as well as possibly the flag so that any further errors can be detected. Thus, any uncorrectable errors or missing data will be indicated by the flag, but the fault that caused the data to be unusable will not be re-diagnosed each time the unusable data is passed on.

One embodiment comprises an interface which is used to convey data from one component or subsystem to another. When the interface receives data from the first subsystem, the data is examined to determine whether it contains an uncorrectable error (including missing data.) If the data contains an uncorrectable error, the interface examines the flag corresponding to the data to determine whether hardware fault diagnosis has already been initiated. If diagnosis has already been initiated, the data is passed to the second subsystem without initiating further diagnosis. If diagnosis has not been initiated, or if the flag itself is missing or unusable so that it is not clear whether diagnosis has or has not been performed, the interface initiates diagnosis and sets the flag to indicate that diagnosis has already been performed. The data (and corresponding flag) are then passed to the second subsystem. If the data contains an uncorrectable error, data error handling procedures will be performed, regardless of the value of the corresponding flag.

In one embodiment, the interface comprises a circuit that accepts data which does not include a flag and produces a corresponding flag. In this embodiment, data consisting of a value and an error detection/correction code is input to a detector/corrector. The detector/corrector checks the value against the error detection/correction code to determine whether the value is correct. ("Correct" is used herein to describe data for which the corresponding error detection/correction code indicates no errors.) If the value is correct, the value is output on a data line while a "false" signal is asserted on a flag line. If the value is incorrect but correctable, the value is corrected and then output on the data line while a "false" signal is asserted on the flag line. If the value is incorrect and cannot be corrected using the error detection/correction code, hardware diagnosis is initiated and a "true" signal is asserted on the flag line. When the "true" signal is asserted, the data line may output either the uncorrectable value or a predetermined value (e.g. some value describing the detected error.) The circuit may include an ECC generator that produces an error detection/correction code corresponding to the value and the flag output by the circuit.

BRIEF DESCRIPTION OF THE DRAWINGS

Other objects and advantages of the invention will become apparent upon reading the following detailed description and upon reference to the accompanying drawings in which.

Figure 1:
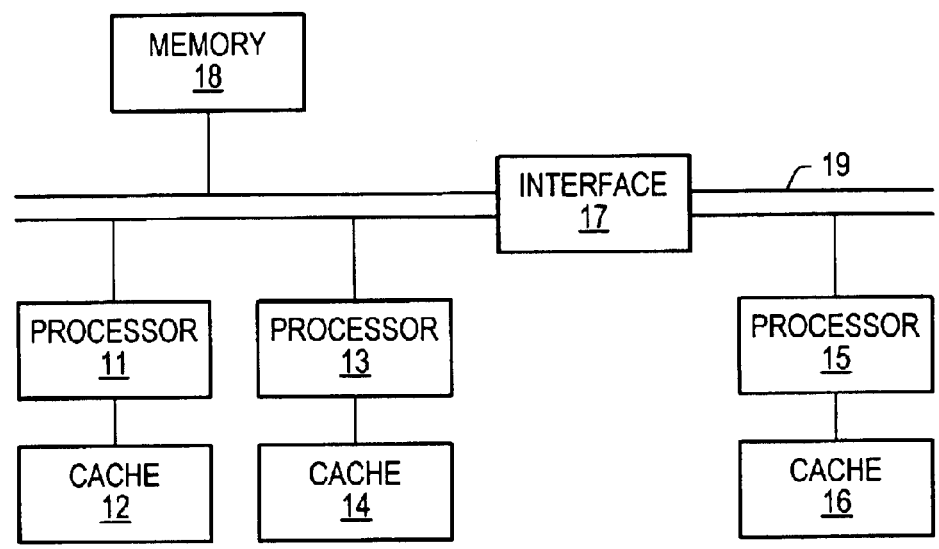
FIG. 1 is a block diagram of a first shared memory computing system.

While the invention is susceptible to various modifications and alternative forms, specific embodiments thereof are shown by way of example in the drawings and will herein be described in detail. It should be understood, however, that the drawings and detailed description set forth below are not intended to limit the invention to the particular form disclosed, but on the contrary, are intended to cover all modifications, equivalents and alternatives falling within the spirit and scope of the present invention as defined by the appended claims.

DETAILED DESCRIPTION OF THE PREFERRED EMBODIMENTS

One embodiment of the invention is described below. It should be noted that this embodiment is presented as an example and that many other embodiments are possible.

In one embodiment, an interface is implemented between a transmitting subsystem and a receiving subsystem. The interface is configured to determine whether data transmitted from the transmitting subsystem to the receiving subsystem contains unusable data and, if so, whether hardware fault diagnosis has already been initiated to locate the source of the error that caused the data to be unusable. If there is an indication that diagnosis has already been initiated for the detected error, no additional diagnosis is initiated. If there is no such indication, hardware diagnosis will be initiated.

For the purposes of this disclosure, "initiating" hardware diagnosis means taking an action that causes or is part of the diagnosis. For example, one embodiment may initiate hardware diagnosis by producing a signal which indicates that diagnosis should be performed. This signal may be transmitted to diagnosis circuitry to cause that circuitry to begin diagnosis, or it may be stored for later use in the diagnosis. In another embodiment, diagnosis may be initiated by storing an indication of the error that necessitates the diagnosis or by storing status information related to the error or the hardware that detected the error. Hardware diagnosis may be performed by the same circuitry that initiates the diagnosis, or it may be performed by separate diagnosis circuitry.

Figure 2A:
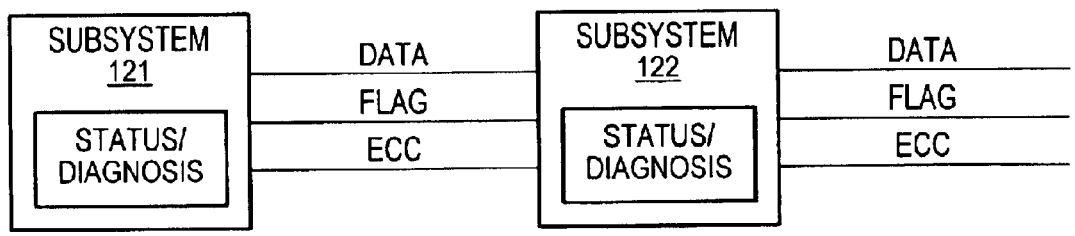
FIGS. 2a and 2b are block diagrams illustrating a series of subsystems.

Referring to FIG. 2a, a block diagram illustrating a series of subsystems is shown. Subsystem 121 is shown conveying data to subsystem 122. The data may be conveyed in response to a request from subsystem 122, or a request from another subsystem which will receive the data from subsystem 122. Subsystem 121 and other subsystems may also utilize an interface of the type employed in subsystem 122.

Subsystem 121 is configured to transmit to subsystem 122 information including data, a corresponding flag, and an error detection/correction code corresponding to the data and flag. The flag is indicative of a previously initiated diagnosis of the hardware fault which caused the data to be unusable. In this embodiment, the error detection/correction code covers both the data and the flag, enabling errors in either the data or the flag to be detected. In other embodiments, the error detection/correction code may cover only the data, only the flag, or neither.

The data transmitted by subsystem 121 is received by an interface within subsystem 122. The interface includes an error detection/correction unit and a status capture/diagnosis control (status/diagnosis) unit. The error detection/correction unit examines the information to determine whether the data and/or flag contain any errors, as determined by the error detection/correction code. (It is assumed in this instance that the error detection/correction code transmitted by subsystem 121 has been generated based upon the data and flag, regardless of whether or not the data is usable.)

If no errors are detected, the interface simply passes the information through to the subsystem, along with the flag and error detection/correction code. If an error is detected, the error detection/correction unit determines whether or not the error is correctable. (For the purposes of this disclosure, "correctable" data includes both data having correctable errors and data having no errors at all.) If the error is correctable, the error detection/correction unit corrects it and passes the information through to the subsystem. If the error is not correctable, several actions are taken by the status/diagnosis unit, regardless of whether or not the flag indicates that the data is unusable. These actions include: storing status information; setting the flag to indicate that the data is unusable; initiating hardware diagnosis; and generating a new error detection/correction code based on the unusable data and the flag. The new error detection/correction code is generated to enable the interfaces of subsequent subsystems to determine whether errors subsequent to this one have occurred. This new information is then passed through to the subsystem.

If subsystem 122 is the end-user of the data (i.e., it is not simply routing the data to another subsystem,) it must determine whether or not the data which has received is usable. If the flag is not set, the data is usable, and operation of the subsystem proceeds normally. If the flag is set, the data is unusable, and the subsystem must take any steps which are necessary to handle the data error. These steps may include, for example, notification of clients, error recovery procedures or termination of client processes. If subsystem 122 is not the end-user of the data (i.e., if its purpose in handling the data is merely to route the data to another subsystem,) it is not necessary for the subsystem to determine whether the data is usable. The subsystem simply passes the information on to a subsequent subsystem.

Figure 2B:
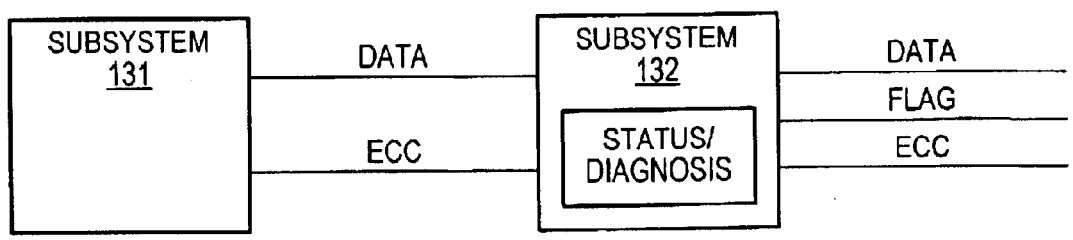

As illustrated by FIG. 2b, the first subsystem 131 may in some embodiments not be configured to transmit a flag corresponding to the transmitted data. In such embodiments, the data will be handled by the second subsystem 132 in the same manner as if the data were accompanied by a flag that was not set. A flag is added by the interface (and set, if appropriate) before it is passed on to the subsystem.

The methods implemented by the interfaces described above are illustrated in FIGS. 3–5. These figures are explained in detail below.

Figure 3:
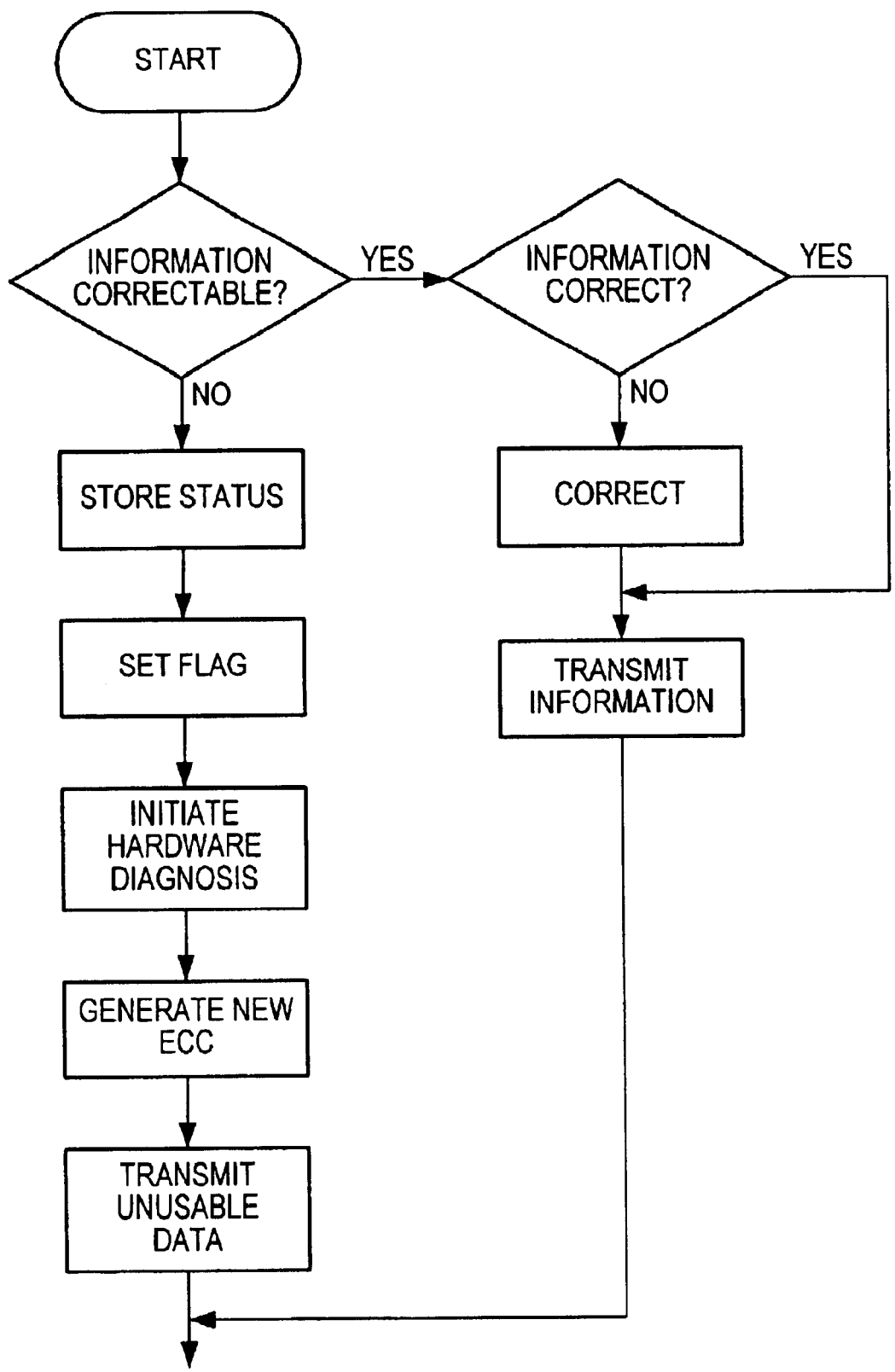
FIG. 3 is a flow diagram illustrating the operation of an interface for a subsystem in one embodiment.

FIG. 3 is a flow diagram illustrating the method embodied in the system described above, in which a new error detection/correction code is generated for unusable data which is detected and passed on by an interface. (Other embodiments which may not generate a new error detection/correction code are described below.) When information is transmitted to the interface, it is examined to determine whether it contains uncorrectable errors. The presence of an uncorrectable error is determined using an error detection/correction code corresponding to the information. If the information is correctable, it is determined whether the information contains a correctable error or no error at all. If there is no error at all, the information is transmitted from the interface to the subsystem. If there is an error which is correctable, the error is corrected and the corrected information is transmitted to the subsystem.

If the information contains an uncorrectable error, the corresponding data is unusable. Further, because the error detection/correction code is assumed in this embodiment to have been generated by the subsystem from which the information was received (or an interface corresponding thereto,) diagnosis of the hardware fault which caused the uncorrectable error is required. In other words, since the error detection/correction code transmitted by the previous subsystem is assumed to match the data, any errors must necessarily have occurred after any hardware diagnosis could have been performed by that subsystem. The interface therefore performs several functions, including storing status information associated with the error, setting the flag to indicate that the data is unusable and initiating hardware fault diagnosis. The unusable data is then passed to the subsystem (with the flag set to indicate that it is unusable.) The unusable data and the flag are transmitted with a new error detection/correction code. The new error detection/correction code is generated based upon the unusable data and the flag so that any further errors in this information (which would indicate further hardware faults) can be detected.

Figure 4:
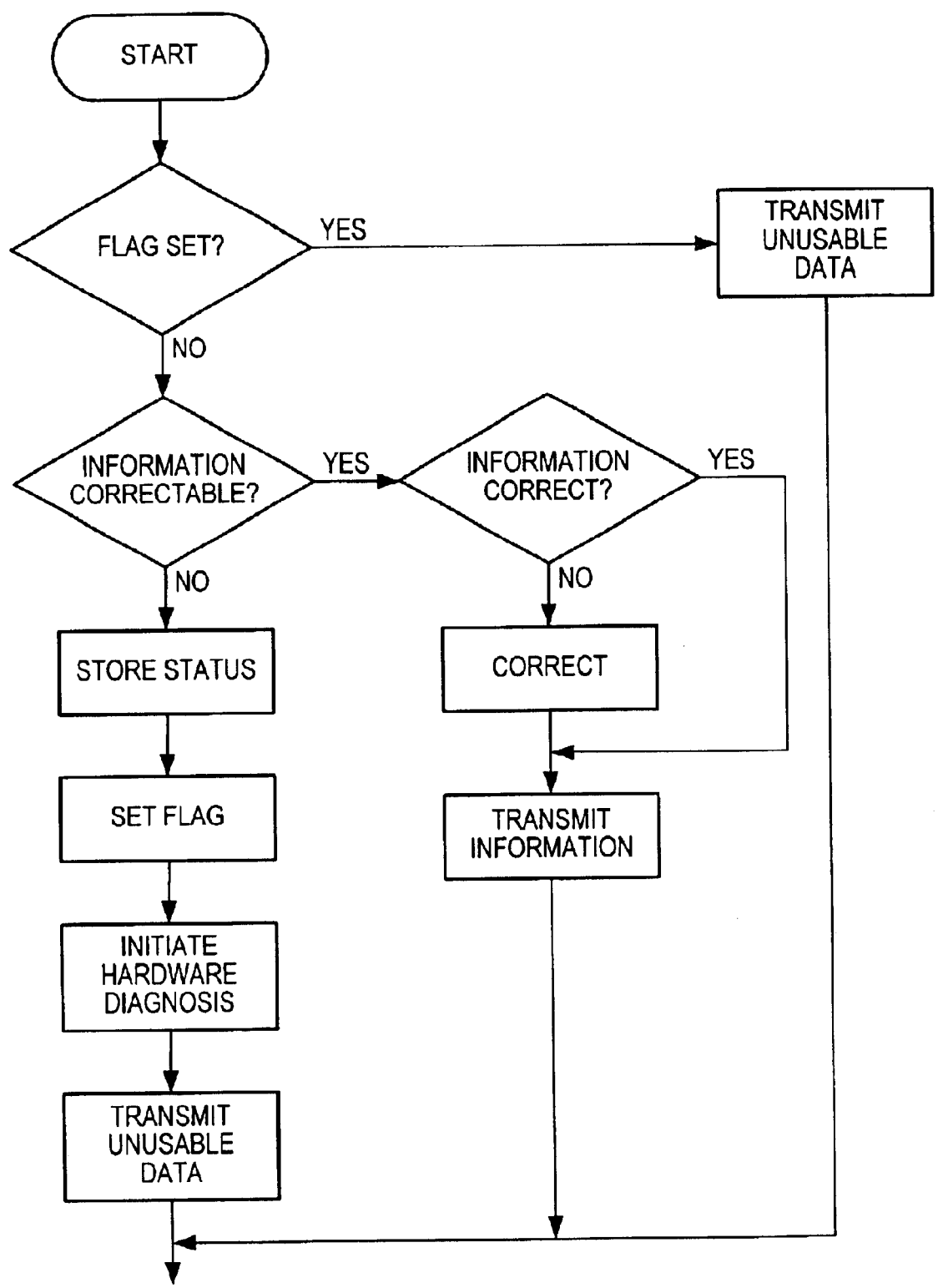
FIG. 4 is a flow diagram illustrating the operation of an interface for a subsystem in an alternate embodiment.
Figure 5:
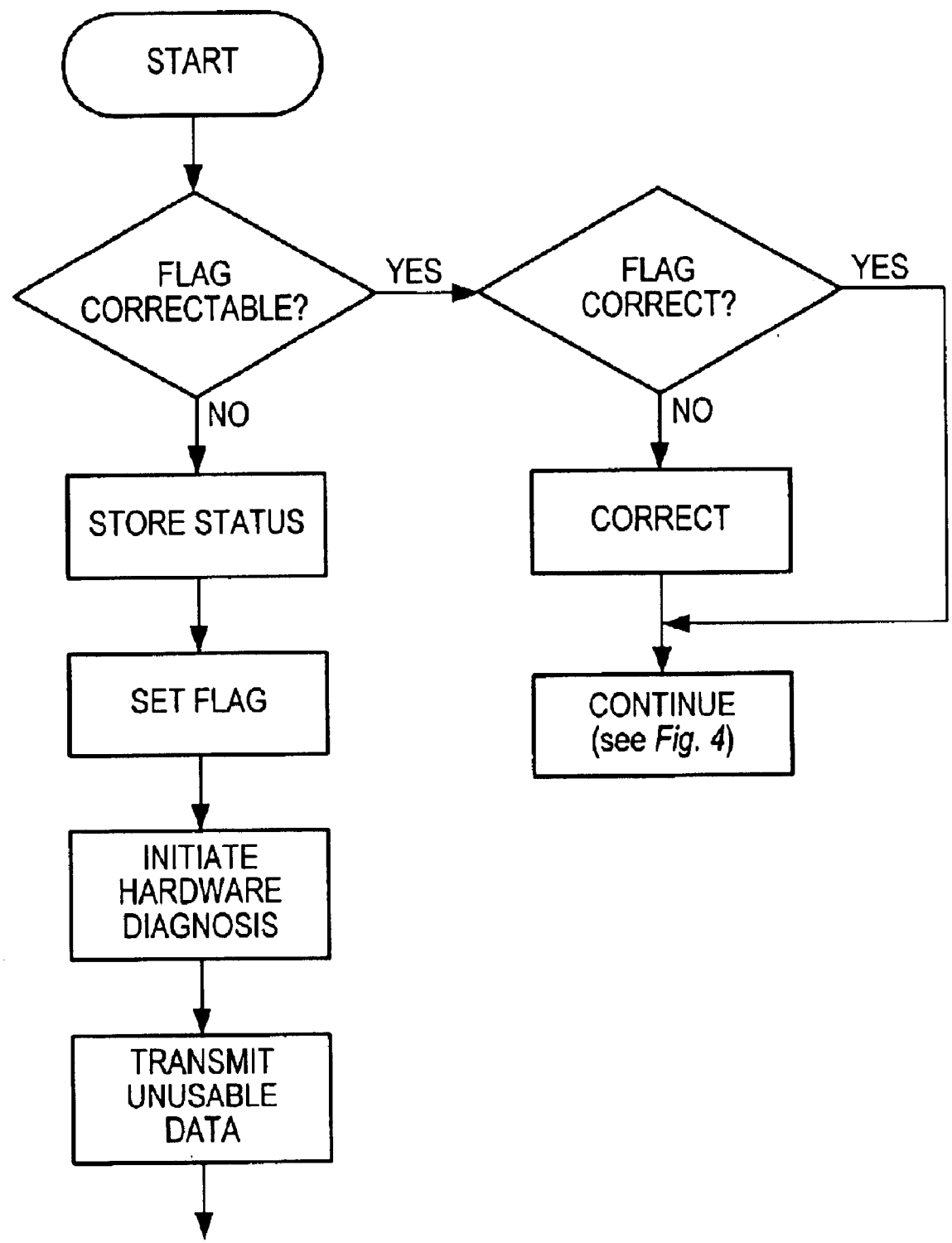
FIG. 5 is a flow diagram illustrating the operation of an interface for a subsystem in another alternate embodiment.

The description in the preceding paragraphs is directed to an embodiment in which, after detection of uncorrectable errors, a new error detection/correction code is generated for the unusable data and the corresponding flag. Because a new error detection/correction code is generated, additional errors can be detected and diagnosis of the hardware faults that caused the additional errors can be initiated. In an alternate embodiment, a new error detection/correction code may not be generated. Such an embodiment implements a slightly different method than described above. This method is illustrated in FIG. 4.

In this embodiment, when information is received by the interface, it is first examined to determine whether the flag is set. If the flag is set, no further action needs to be taken before the information is passed to the subsystem. If the flag is not set, the information is examined to determine whether the data is correctable. If the data is correctable, it is determined whether the data is correct or whether it contains correctable errors. If the data is correct, the information is passed onto the subsystem without further action. If the data contains correctable errors, the errors are corrected and the information is then passed on to the subsystem. If the data contains uncorrectable errors, procedures associated with hardware fault diagnosis must be undertaken. (Diagnosis must be performed because the flag in this instance was not set, indicating that diagnosis had not previously been performed.) The procedures which must be performed include storing status information, setting the flag to indicate that diagnosis has been initiated, and actually initiating the diagnosis. The unusable data, accompanied by the old error detection/correction code and the flag which has now been set, is then transmitted to the subsystem.

In yet another embodiment, the data may be covered by a first error detection/correction code, while the flag that indicates whether the data is unusable is covered by a second error detection/correction code. The method used in this embodiment varies somewhat from the method described in the preceding paragraphs, as explained below and illustrated in FIG. 5. (FIG. 5 actually depicts only the initial steps of the method—if the flag is correct or correctable, the method continues as illustrated in FIG. 4.)

In this embodiment, when information is received by the subsystem's interface, the flag and the error detection/ correction code corresponding to the flag are examined first to determine whether the flag is correctable. If the flag is correct, the method proceeds with the method illustrated in FIG. 4 (i.e., the flag is examined to determine whether it is set, and so on.) If the flag contains correctable errors, the errors are corrected and then the method continues as illustrated in FIG. 4. If, when the information is received by the interface, it is determined that the flag contains an uncorrectable error, steps will be taken to determine the cause of the error. These steps include storing status information, initiating the diagnosis and setting the flag to indicate that diagnosis has been initiated. The data, flag and corresponding error detection/correction codes are then transmitted to the subsystem.

As indicated above, the information received by the interface is processed by the interface and is then passed on to the subsystem. If the data passed from the interface to the subsystem is usable, the subsystem processes the information normally. For example, it may perform operations using the data, or it may simply route the data to another subsystem. If the data is unusable (i.e., the flag is set) and the subsystem requested the data, the subsystem will initiate data error handling procedures which may include notifying client processes, terminating client processes, requesting the information again, or other actions. If the subsystem did not request the data, but is only routing the data to another subsystem, it typically will not initiate procedures to handle the data error. It will simply route the data. The error handling procedures will be left to the subsystem that requested the data.

It should be noted that, although the foregoing description refers to systems and methods which include error correction mechanisms, it is not necessary to include these mechanisms. For example, an interface for a subsystem may be configured to receive information which includes data, a parity bit and a flag. If the parity bit covers the data, single-bit errors can be detected in the data. When an error is detected, the flag can be examined to determine whether hardware fault diagnosis has already been initiated for this data. If the flag has been set, the data error can be handled without initiating further hardware diagnosis. If the flag has not been set, both hardware diagnosis and data error handling can be initiated and the flag can be set to indicate that this has occurred.

Figure 6:
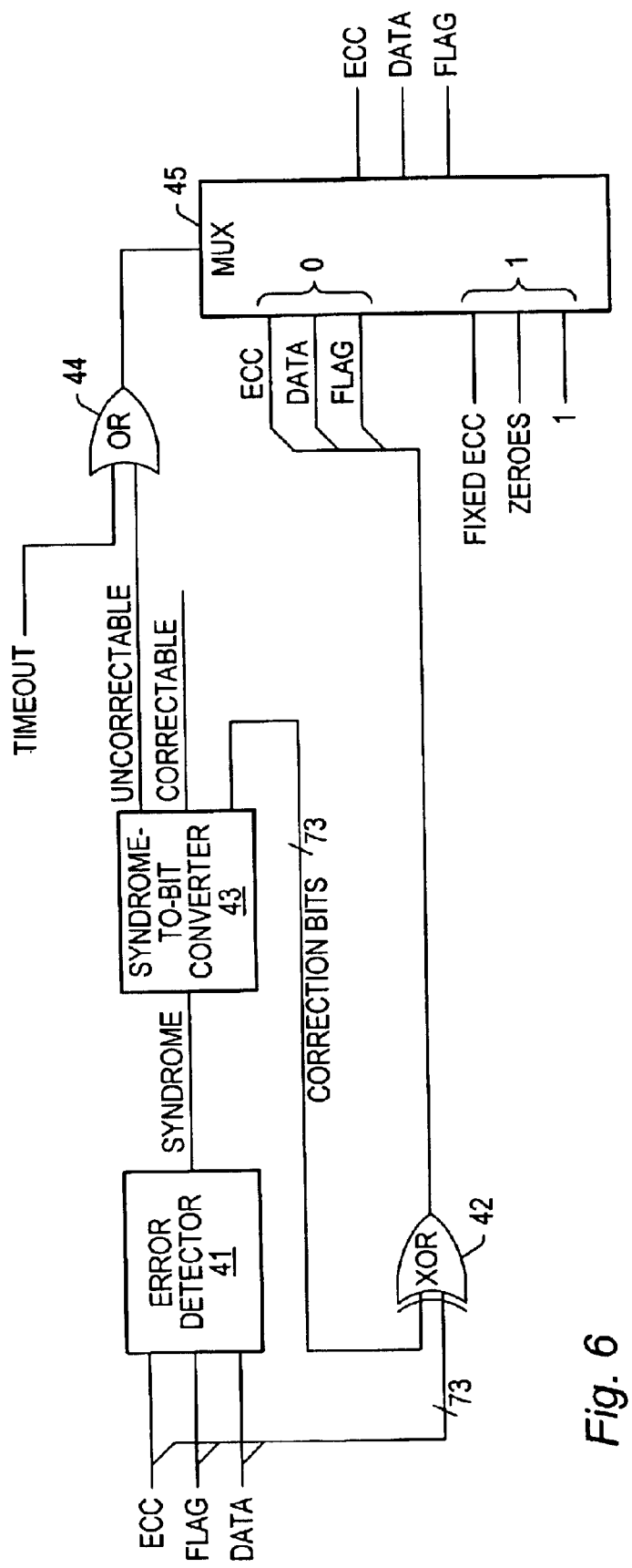
FIG. 6 is a block diagram illustrating an interface circuit in accordance with one embodiment.
Figure 7:
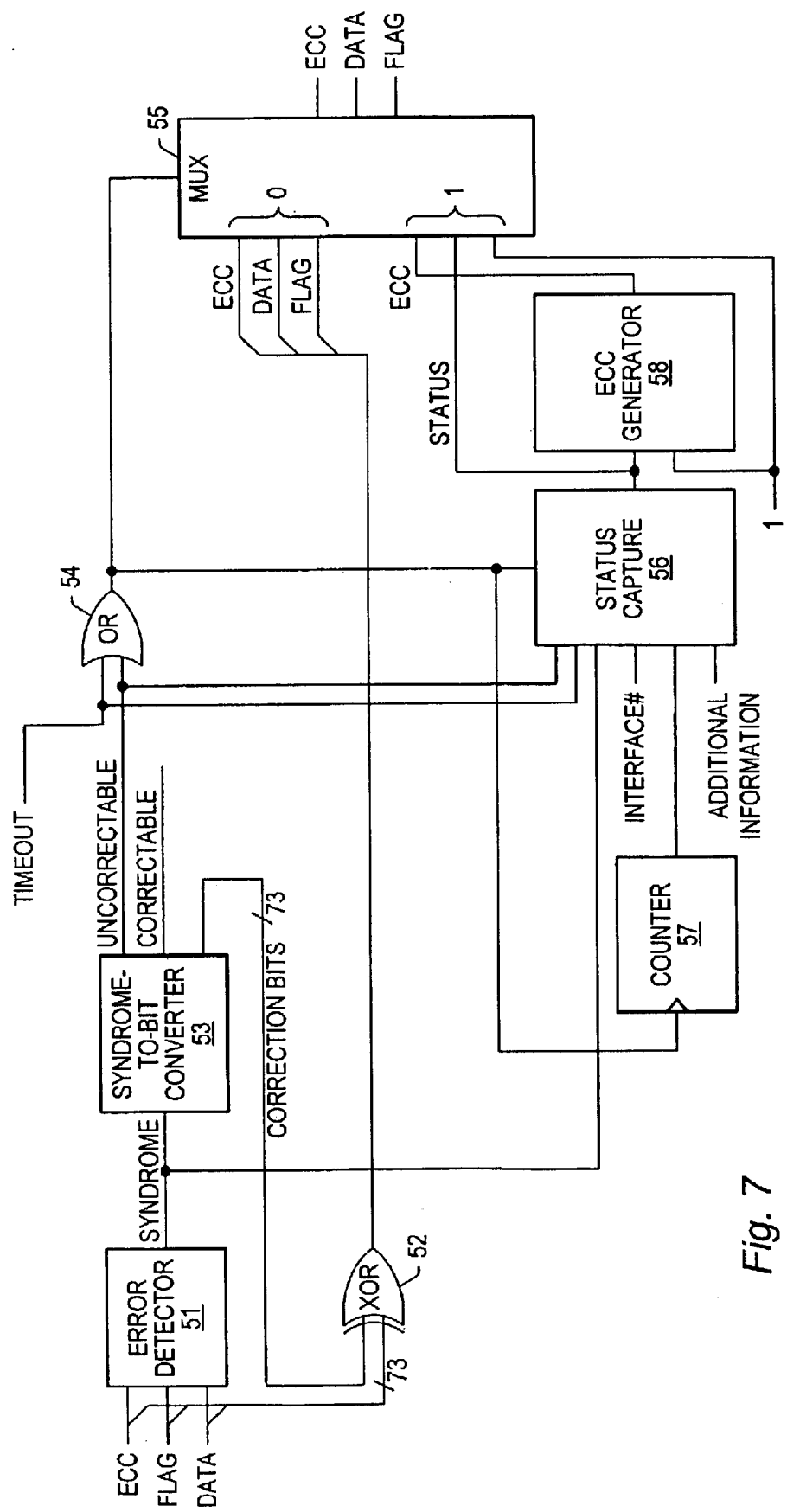
FIG. 7 is a block diagram illustrating an interface circuit in accordance with an alternate embodiment.

FIGS. 6 and 7 depict two embodiments of interface circuits which implement the methods described above. FIG. 6 illustrates an interface circuit in accordance with one embodiment. In this embodiment, the interface is configured to accept information comprising data, a corresponding flag and an error detection/correction code which covers the data, the flag and the error detection/correction code itself. If no errors are detected in the information, or if correctable errors are detected, correct or corrected information is output from the interface. If uncorrectable errors are detected, the interface produces diagnosis-related information at its output. In the depicted circuit, this diagnosis information consists of predetermined data, including a series of zeros (in place of the data,) a flag which is set to 1 to indicate that the data is unusable, and a fixed error detection/correction code.

In FIG. 6, the data, flag and error detection/correction code are input to both error detector 41 and exclusive OR gate 42. (It should be noted that exclusive OR gate 42 may be implemented using 73 two-input exclusive OR gates.) Error detector 41 generates a syndrome code which is transmitted to syndrome-to-bit converter 43. If the information input to error detector 41 contains correctable errors, syndrome-to-bit converter 43 uses the syndrome code to generate a set of correction bits which are also input to exclusive OR gate 42. As indicated in the figure, the information and correction bits are each 73 bits wide in this embodiment (64 bits of data, one bit of flag and eight bits of error detection/correction code.) The correction bits include 0's corresponding to each correct bit in the information and 1's corresponding to each incorrect bit. (If the information contains no errors, all the correction bits are 0's.) Thus, if the information input to error detector 41 is correct, the output of exclusive OR gate 42 is identical to the input information. If the information is correctable, the incorrect data bits are inverted by exclusive OR gate 42, thus creating correct information.

If the information input to error detector 41 contains uncorrectable errors, an indication of the errors (i.e., 1) is input to OR gate 44. OR gate 44 also accepts as an input an indication of whether a request for the information has timed out. Thus, OR gate 44 outputs a 1 if the data is unusable (i.e., it contains uncorrectable errors or is missing) and a 0 if the data is correct or correctable. This output signal of OR gate 44 transmitted to multiplexer 45 and is used as a select signal. Multiplexer 45 accepts two other sets of inputs: the corrected data from exclusive OR gate 42; and the predetermined data described above (i.e., zeros, a set flag and a fixed error detection/correction code.) This predetermined data may be stored in registers (not shown) which are hard-wired to multiplexer 45. If the select input is a 0, the correct/corrected information is output from multiplexer 45. If the select input is a 1, the predetermined data is output.

In the circuit of FIG. 6, the predetermined data selected by multiplexer 45 provides information which is used in the diagnosis of the hardware fault that caused the error. The selection of this predetermined data can be considered initiation of hardware diagnosis. In other embodiments, the output of OR gate 44, which controls selection of the predetermined data, can be transmitted to external diagnosis circuitry to trigger diagnosis. Although the latter embodiment employs a more obvious means of initiating diagnosis, both triggering external circuitry and selecting predetermined data are considered to initiate diagnosis for the purposes of this disclosure.

It should be noted that, although the purpose of the interface described herein is to increase the system's ability to diagnose and recover from errors, the additional circuitry can also have the paradoxical effect of making the system more vulnerable to undetected data corruption. The interface circuit described in the preceding paragraphs, however, is designed to minimize, if not eliminate, this problem.

The circuit described above and illustrated in FIG. 6 can be referred to as an "honest" circuit because, in contrast to some of the other implementations described above, it does not generate a new error detection/correction code each time information is passed through the circuit. Instead, it merely makes corrections to the existing data, flag and error detection/correction code (or outputs predetermined data, flag and error detection/correction code.) If the circuit were to introduce one or more errors into the information it is highly unlikely that the resulting error detection/correction code would match the data. Thus, rather than hiding any errors behind a newly generated error detection/correction code, the errors should be easily identifiable by subsequent interfaces. The error can therefore be considered an "honest" mistake.

FIG. 7 illustrates an interface circuit in another embodiment. The circuit depicted in this figure is very similar to the circuit of FIG. 6, but rather than producing a predetermined data value, flag and error detection/correction code at the output of the multiplexer when the input information is unusable, new information is generated which may be more useful in the diagnosis of detected uncorrectable errors.

Information comprising data, a flag and a corresponding error detection/correction code is input to error detector 51 and exclusive OR gate 52. (Similar to exclusive OR gate 42 of FIG. 6, exclusive OR gate 52 may be implemented using 73 two-input exclusive OR gates.) Error detector 51 generates a syndrome code which is input to syndrome-to-bit converter 53. Syndrome-to-bit converter 53 converts the syndrome code to a set of correction bits which are input to exclusive OR gate 52. The syndrome code is also transmitted to status capture unit 56, which will be described in more detail below.

As with the circuit of FIG. 6, OR gate 54 receives two input signals: the first indicating whether the information input to error detector 51 contains uncorrectable errors; and the second indicating whether the request for the information has timed out. If either of these signals is asserted (i.e., the signal is a 1,) the output of OR gate 54 will be asserted. The signal output by OR gate 54 is transmitted to multiplexer 55, status capture unit 56 and counter 57.

Multiplexer 55 receives the output of OR gate 54 as a select signal. If the signal is a 0, the correct/corrected information generated by exclusive OR gate 52 is selected to be output by multiplexer 55. (Exclusive OR gate 52 functions in the same manner as exclusive OR gate 42 described above with reference to FIG. 6.) If the signal is a 1, diagnosis information (which in this embodiment comprises status information) is selected to be output by multiplexer 55. This status information in this embodiment identifies whether the data was missing or uncorrectable and identifies the associated syndrome code, interface number, event number and any other additional information which may be useful in performing hardware diagnosis. It should be noted that the status information captured in other embodiments may not include all of the data captured in the embodiment of FIG. 7.

The status information which is input to multiplexer 55 is collected by status capture unit 56. Inputs to status capture unit 56 include the timeout and uncorrectable error signals which are input to OR gate 54, the syndrome code conveyed from the error detector 51 to syndrome-to-bit converter 53, an interface identifier signal (which is fixed) and an event number signal from counter 57. As shown in the figure, counter 57 is clocked by the output of OR gate 54 so that it is incremented each time an uncorrectable error or a timeout is detected. FIG. 7 also depicts an input for additional information to show that any information which might be useful in diagnosis of hardware faults may be included in the status information. If the data input to error detector 51 is unusable, the status information is output by multiplexer 55 in the data field of the output information.

Although in this embodiment, the status information is transmitted in the data field, it should be noted that the status information may be accessed in other ways in other embodiments. For example, in one embodiment, the status information is stored in one or more status registers of status capture unit 56. These status registers may be read out in a completely separate operation from the original data transmission, such as a read cycle addressing the status registers. This separate operation may use the same bus as the data transmission, or it may use a completely separate data transmission mechanism.

The circuit in FIG. 7 also includes an ECC generator 58. ECC generator 58 produces an error detection/correction code corresponding to the status information generated by status capture unit 56 and the unusable data flag ("1"). Even though a new error detection/correction code is generated, however, this circuit can still be considered an "honest" circuit because the newly generated error detection/correction code is output by multiplexer 55 only if the information input to error detector 51 is unusable. If the information is correct or contains correctable errors, syndrome-to-bit converter 53 and exclusive OR gate 52 only correct the erroneous bits. As explained above, it is highly unlikely that errors generated by the interface itself would result in an error detection/correction code that matched the output data. "Honest" mistakes made by the interface should therefore be easily detectable and correctable by subsequent interfaces. (It should also be noted that errors in the status information may go undetected, but while this might hinder the diagnosis of a particular error, it will not affect normal processing of error-free data.)

As indicated above, FIG. 6 does not include circuitry which is explicitly referred to as a diagnosis unit. Likewise, the circuit of FIG. 7 does not explicitly show diagnosis circuitry. It is contemplated that the signals produced by these circuits (e.g., the outputs of OR gates 44 or 54, or the outputs of multiplexers 45 or 55) may be transmitted to diagnosis circuitry upon detection of unusable data. Nevertheless, status capture unit 56, counter 57 and ECC generator 58 in the circuit of FIG. 7 perform functions that are considered initial steps in the diagnosis of hardware faults, and activation of these units is considered for the purposes of this disclosure to initiate diagnosis.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A system comprising:
    a first subsystem configured to provide as an output first information; and
    a second subsystem coupled to said first subsystem to receive said first information, wherein said second subsystem is configured to produce as an output second information; and
    wherein said first information includes an input data value; and
    wherein said second subsystem is configured to determine whether said input data value is unusable and to produce an output flag indicative of whether said input data is unusable, wherein said output flag is contained in said second information; and
    wherein if said input data value is unusable, said second subsystem is configured to inhibit hardware diagnosis if said first information contains an input flag which is set to indicate that said input data value is unusable.

2. The system of claim 1 wherein said first information contains an input error detection code corresponding to said input data value.

3. The system of claim 2 wherein said input error detection code comprises an error correction code.

4. The system of claim 3
    wherein said second information further includes an output data value and an output error detection code corresponding to said output data value;
    wherein if said first information does not contain an uncorrectable error, said second subsystem is configured to correct said input data value and provide said first information as said second information; and
    wherein if said first information contains an uncorrectable error, said second subsystem is configured to provide predetermined information as said second information.

5. The system of claim 3
    wherein said second information further includes an output data value and an output error detection code corresponding to said output data value;
    wherein if said first information does not contain an uncorrectable error, said second subsystem is configured to correct said input data value and provide said first information as said second information; and
    wherein if said first information contains an uncorrectable error, said second subsystem is configured to provide status information as said second information.

6. The system of claim 1 wherein initiating hardware diagnosis comprises storing status information.

7. The system of claim 6 wherein said second subsystem is configured to store said status information in one or more registers within said second subsystem.

8. The system of claim 6 wherein said second subsystem is configured to provide said status information as part of said second information if said first information is unusable.

9. An interface comprising:
    a set of input lines;
    a set of output lines; and
    an error detector coupled to said input lines and said output lines, wherein said error detector is configured to determine whether input information received on said input lines is unusable; and
    wherein if said input information is unusable and if said input information does not include a flag which indicates that said input information is unusable, the interface is configured to initiate hardware diagnosis
    wherein if said input information is unusable and if said input information includes a flag which indicates that said input information is unusable, the interface is configured to inhibit hardware diagnosis.

10. The interface of claim 9 further comprising a multiplexer, wherein said input lines are coupled to a first set of inputs of said multiplexer, wherein said output lines are coupled to a set of outputs of said multiplexer, wherein a second set of inputs of said multiplexer are coupled to receive diagnosis information, wherein if said input information is usable, said multiplexer is configured to output said input information, and wherein if said input information is unusable, said multiplexer is configured to output predetermined output information.

11. The interface of claim 10 further comprising a status capture unit coupled to said second set of inputs of said multiplexer and configured to provide status information to said multiplexer.

12. The interface of claim 10 further comprising a set of registers coupled to said second set of inputs of said multiplexer and configured to provide predetermined diagnosis information to said multiplexer.

13. The interface of claim 10 wherein if said input information is unusable, said multiplexer is configured to inhibit hardware diagnosis if said input information includes a flag which indicates that said input information is unusable.

14. The interface of claim 10 wherein the interface further comprises an error corrector which is configured to correct correctable errors in said input information.

15. The interface of claim 14 wherein said error corrector comprises a syndrome-to-bit converter configured to receive a syndrome code from said error detector and to generate one or more correction bits corresponding to erroneous bits in said input information.

16. The interface of claim 10 further comprising a status capture it, wherein if said input information is unusable and if said input information does not include flag which indicates that said input information is unusable, said status capture unit is configured to capture status information associated with said input information.

17. The interface of claim 10 further comprising one or more registers coupled to said multiplexer, wherein said registers are configured to store said predetermined output information.

18. The interface of claim 17 wherein said predetermined output information stored in said registers comprises a data field containing 0's, a flag field containing a 1 and a predetermined error detection/correction code corresponding to said data field an said flag field.

19. An interface comprising:
    an error detector;
    a signal line coupled to said error detector;
    an input line coupled to said error detector; and
    an output line coupled to said error detector;
    wherein said error detector is configured to receive input information on said input line and to determine whether said first information contains an uncorrectable error;
    wherein if said input information contains said uncorrectable error, said error detector is configured to provide a hardware diagnosis signal on said signal line, wherein said hardware diagnosis signal initiates hardware diagnosis; and wherein said error detector is configured to provide output information corresponding to said input information on said output line, wherein said output information contains a flag indicative of whether said hardware diagnosis has been initiated;

wherein the interface further includes:
an error corrector, wherein said error corrector is configured to correct correctable errors in said input information; and
a multiplexer configured to receive said input information and predetermined information, wherein if said input information does not contain said uncorrectable error, said multiplexer is configured to produce said input information at said output line, and wherein if said input information contains said uncorrectable error, said multiplexer is configured to produce said predetermined information at said output line.

20. The interface of claim 19 further comprising hardware diagnosis circuitry coupled to said signal line, wherein said hardware diagnosis circuitry is configured to perform hardware diagnosis in response to receiving said hardware diagnosis signal.

21. A system comprising:
a first subsystem configured to provide as an output first information; and
a second subsystem coupled to said first subsystem to receive said first information, wherein said second subsystem is configured to produce as an output second information; and
wherein said first information includes an input data value; and
wherein said second subsystem is configured to determine whether said input data value is unusable and to produce an output flag indicative of whether said input data is unusable, wherein said output flag is contained in said second information;
wherein said first information contains an input error detection code corresponding to said input data value; and
wherein if said input data value is unusable and an input flag included with said first information is not set to indicate that said input data value is unusable, said second subsystem is configured to initiate hardware diagnosis.

22. The system of claim 21 wherein if said input data value is unusable, said second subsystem is configured to inhibit hardware diagnosis if said input flag is set to indicate that said input data value is unusable.

23. The system of claim 21 wherein said input error detection code comprises an error correction code.

24. The system of claim 23
wherein said second information further includes an output data value and an output error detection code corresponding to said output data value;
wherein if said first information does not contain an uncorrectable error, said second subsystem is configured to correct said input data value and provide said first information as said second information; and
wherein if said first information contains an uncorrectable error, said second subsystem is configured to provide predetermined information as said second information.

25. The system of claim 23
wherein said second information further includes an output data value and an output error detection code corresponding to said output data value;

wherein if said first information does not contain an uncorrectable error, said second subsystem is configured to correct said input data value and provide said first information as said second information; and
wherein if said first information contains an uncorrectable error, said second subsystem is configured to provide status information as said second information.

26. The system of claim 21 wherein initiating hardware diagnosis comprises storing status information.

27. The system of claim 26 wherein said second subsystem is configured to store said status information in one or more registers within said second subsystem.

28. A system comprising:
a first subsystem configured to provide as an output first information; and
a second subsystem coupled to said first subsystem to receive said first information, wherein said second subsystem is configured to produce as an output second information; and
wherein said first information includes an input data value; and
wherein said second subsystem is configured to determine whether said input data value is unusable and to produce an output flag indicative of whether said input data is unusable, wherein said output flag is contained in said second information;
wherein said first information contains an input error detection code corresponding to said input data value;
wherein said error detection code comprises and error correction code;
wherein said second information further includes an output data value and an output error detection code corresponding to said output data value;
wherein if said first information does not contain an uncorrectable error, said second subsystem is configured to correct said input data value and provide said first information as said second information; and
wherein if said first information contains an uncorrectable error, said second subsystem is configured to provide predetermined information as said second information.

29. The system of claim 28 wherein if said input data value is unusable, said second subsystem is configured to inhibit hardware diagnosis if said first information contains an input flag which is set to indicate that said input data value is unusable.

30. The system of claim 29 wherein if said input data value is unusable and said input flag is not set to indicate that said input data value is unusable, said second subsystem is configured to initiate hardware diagnosis.

31. The system of claim 30 wherein initiating hardware diagnosis comprises storing status information.

32. The system of claim 31 wherein said second subsystem is configured to store said status information in one or more registers within said second subsystem.

33. A system comprising:
a first subsystem configured to provide as an output first information; and
a second subsystem coupled to said first subsystem to receive said first information, wherein said second subsystem is configured to produce as an output second information; and
wherein said first information includes an input data value; and
wherein said second subsystem is configured to determine whether said input data value is unusable and to produce an output flag indicative of whether said input data is unusable, wherein said output flag is contained in said second information;

wherein said first information contains an input error detection code corresponding to said input data value;

wherein said error detection code comprises an error correction code;

wherein said second information further includes an output data value and an output error detection code corresponding to said output data value;

wherein if said first information does not contain an uncorrectable error, said second subsystem is configured to correct said input data value and provide said first information as said second information; and wherein if said first information contains an uncorrectable error, said second subsystem is configured to provide status information as said second information.

34. The system of claim 33 wherein if said input data value is unusable, said second subsystem is configured to inhibit hardware diagnosis if said first information contains an input flag which is set to indicate that said input data value is unusable.

35. The system of claim 34 wherein if said input data value is unusable and said input flag is not set to indicate that said input data value is unusable, said second subsystem is configured to initiate hardware diagnosis.

36. The system of claim 35 wherein initiating hardware diagnosis comprises storing status information.

37. The system of claim 36 wherein said second subsystem is configured to store said status information in one or more registers within said second subsystem.

* * * * *

UNITED STATES PATENT AND TRADEMARK OFFICE
CERTIFICATE OF CORRECTION

PATENT NO.     : 6,823,476 B2
DATED          : November 23, 2004
INVENTOR(S)    : Williams et al.

It is certified that error appears in the above-identified patent and that said Letters Patent is hereby corrected as shown below:

Column 12,
Line 41, please delete "it" and substitute -- unit --.

Signed and Sealed this

Fifth Day of April, 2005

JON W. DUDAS
*Director of the United States Patent and Trademark Office*